«United States Patent Office 3,093,536 Patented June 11, 1963»

3,093,536
STABILIZED HALOGENATED ENOL ESTER
PESTICIDAL COMPOSITIONS
Erwin S. Loeffler, New Providence, N.J., assignor to Shell Oil Company, New York, N.Y., a corporation of Delaware
No Drawing. Filed Apr. 5, 1961, Ser. No. 100,801
7 Claims. (Cl. 167—22)

This invention relates to novel stabilized pesticide compositions and to their preparation.

The halogenated enol esters of acids of pentavalent phosphorus constitute a class of promising pesticides, for members of this class have been found to be effective insecticides and fungicides, some being of particular value for controlling soil-borne fungi.

These pesticides are characterized by the essential structure:

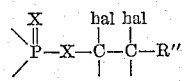

wherein X represents oxygen or sulfur and hal is one of the middle halogens, bromine and chlorine, R″ being middle halogen, or organic as hereinafter described.

For many applications—as in baits, dusts or like insecticidal formulations, and in dusts or granular fungicidal formulations—these pesticides must be impregnated upon solid carrier materials. It has been found that these pesticides tend to be unstable when formulated in this way. The reason for the instability has not been determined with certainty, but from the evidence available, it appears that the instability is not due to the carrier material, but that the instability occurs irrespective of the character of the carrier material.

Because of this instability, the potential utility and value of these pesticides has heretofore been seriously curtailed. Thus, in some cases it has been considered necessary to employ an excess of the insecticide to allow for its decomposition before use, while in other cases it has been considered necessary to prepare the formulation just prior to use. Use of an excess of the insecticide is wasteful, and formulation just before use is not only more costly, but requires that the formulators employ special procedures for which they are not ordinarily equipped.

It now has been discovered that stable dry formulations of these pesticides impregnated upon solid materials results when a minor amount of at least one phenol is intimately incorporated with the formulations and that the presence of the phenol does not adversely affect the pesticidal properties of the formulations. As a result of these discoveries, the shelf life of typical dry formulations of these pesticides can be extended from a period so short as to prohibit use of those formulations unless prepared immediately before use, to periods so long as to permit carry-over of the unused formulations from one season to the next. These discoveries thus substantially extend the useful applications of these pesticides.

Described in more detail, the pesticides which have been found to exhibit instability in dry formulations on solid carriers, and which are stabilized according to this invention, have the formula:

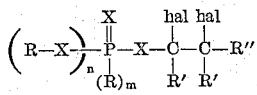

wherein hal represents middle halogen, X represents oxygen or sulfur, R represents hydrocarbon or substituted hydrocarbon, R′ represents hydrogen, middle halogen or one of the groups represented by R, and R″ represents middle halogen, one of the groups represented by R or a functional organic group, n is 0, 1 or 2, and m+n=2, with the proviso that when n=2, both of the symbols, R, together can represent a divalent organic group.

The organic groups represented by the symbols, R and R′, preferably are low molecular weight hydrocarbon or substituted hydrocarbon groups, for example, containing from one to ten carbon atoms each. They may be aliphatic, cycloaliphatic, aromatic or of mixed structure. When aliphatic, they may be either straight-chain or branched-chain in configuration. Typewise, the preferred organic groups include alkyl, cycloalkyl, aryl, alkaryl, and like groups. Illustrative examples include the methyl, ethyl, n- and isopropyl groups, the various isomeric butyl, hexyl and like alkyl groups, the cyclopentyl, cyclohexyl and like cycloalkyl groups, the phenyl group; the naphthyl group; the benzyl, phenethyl, p-methylbenzyl and like aralkyl groups, the isomeric tolyl groups, the isomeric xylyl groups, the ethylphenyl group, the 2,4-dimethyl- and 3,5-dimethylphenyl and like alkaryl groups, and the like.

Where n is 2—that is, in the phosphate pesticides—the two symbols, R, may together represent a divalent hydrocarbon group, each of the symbols representing one valence bond thereof. In such pesticides, it is preferred that the divalent group be an alkylene group of up to 10 carbon atoms, with 1 to 5—preferably 2 to 3—carbon atoms in the chain thereof which bonds together the indicated oxygen atoms.

Further, the symbols, R′, together may represent such a divalent hydrocarbon group.

The substituted hydrocarbon groups represented by R and R′ are those of the above-mentioned hydrocarbon groups which are substituted by one or more non-hydrocarbon substituents. The preferred substituents are middle halogen, the nitro group and amine groups represented by the formula:

and ether groups, R—O—, wherein R, m and n have the respective meanings already set out herein.

Illustrative examples of the non-hydrocarbon groups include monohaloalkyl groups, such as the chloromethyl and bromomethyl groups, the 2-chloroethyl, 1-bromopropyl, 3-chloropropyl and the like; polyhaloalkyl groups, such as the dichloromethyl, tribromomethyl, 1,2-dichloroethyl, 2,2-dibromoethyl, 3,3 - dichloro-2 - bromopropyl groups, and the like; nitroalkyl groups such as the 2-nitroethyl group; halo-substituted aromatic groups such as the various isomeric chloro- and bromophenyl groups, the various isomeric polyhalophenyl groups, such as the 2,6-dichlorophenyl group, the 3,5-dibromophenyl group and the like; amino-substituted groups, such as the 2-aminoethyl group, the 2-dimethylaminoethyl group and the like; the aniline group; the p-dimethylaminophenyl group; the p-ethylaminobenzyl group and the like.

The symbol, R″, may also represent a functional organic group, such as a carboaliphaticoxy group, particularly a carboalkoxy or an alkoxyalkyleneoxycarbonyl group of up to ten carbon atoms; it may represent an ether group, R—O—, wherein R has the meaning already set out; it may represent an acyloxyalkoxycarbonyl group wherein the acyl group is

or it may represent an amide group having the amino moiety set out above.

Of particular interest because of their high insecticidal activity are the phosphates (n=2, X=oxygen) of the foregoing generic formula wherein each hal is bromine, each R is lower hydrocarbon—particularly alkyl of up to seven carbon atoms, aryl of up to ten carbon atoms, or aralkyl of up to ten carbon atoms (the phenyl and benzyl groups being particularly preferred), R' bonded to the alpha carbon atom is hydrogen or one of the groups represented by R, R' bonded to the beta carbon atom is hydrogen or middle halogen and R" is middle halogen. Of most importance of this subgenus are the dialkyl 1,2-dibromo-2-halo-ethyl phosphates and dialkyl 1,2-dibromo-2,2-dihaloethyl phosphates, having the formula:

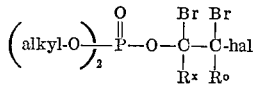

wherein alkyl represents an alkyl group of from 1 to 4 carbon atoms, hal represents middle halogen, preferably chlorine, $R^x$ represents hydrogen or alkyl of from 1 to 4 carbon atoms, and $R^o$ represents hydrogen or middle halogen, preferably chlorine. Most potent appear to be those wherein $R^x$ is hydrogen, hal is chlorine and $R^o$ is chlorine.

Of particular interest because of their high fungicidal activity are the phosphates ($n=2$) of the foregoing generic formula wherein each hal is bromine, each R is lower hydrocarbon—particularly alkyl of up to seven carbon atoms, aryl of up to ten carbon atoms, or aralkyl of up to ten carbon atoms (the phenyl and benzyl groups being particularly preferred), R' bonded to the alpha carbon atom is hydrogen or one of the groups represented by R, R' bonded to the beta carbon atom is hydrogen or halogen and R" represents the group

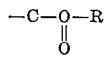

Of most importance of this subgenus are the dialkyl 1,2-dibromo-2-carboalkoxyethyl phosphates, having the formula:

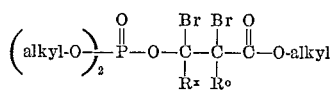

wherein alkyl represents an alkyl group of from 1 to 4 carbon atoms, $R^x$ represents hydrogen, or alkyl from 1 to 4 carbon atoms, and $R^o$ represents hydrogen or middle halogen, preferably chlorine. Typical species of these pesticides include:

Dimethyl 1,2-dibromo-2-carbomethoxy-1-methylethyl phosphate
Dimethyl 1,2-dibromo-2,2-dichloroethyl phosphate
Dimethyl 1,2-dibromo-2-benzyloxycarbonyl-1-methylethyl phosphate
Dimethyl 1,2-dichloro-2-phenyloxycarbonyl-1-methylvinyl phosphate
Dimethyl 1,2-dibromo-2-(alpha-methylbenzyloxycarbonyl)-1-methylvinyl phosphate
1,2-dibromo-2-carbomethoxy-1-methylethyl methyl p-nitrophenyl phosphate
1,2-dibromo-2-(2-acetoxyethoxycarbonyl)-1-methylethyl dimethyl phosphate
1,2-dibromo-2-(2-benzoyloxyethoxycarbonyl)ethyl dimethyl phosphate
1,2-dibromo-2-(2-methoxyethoxycarbonyl)-1-methylvinyl dimethyl phosphate
1,2-dibromo-2-carbethoxy-1-methylethyl ethyl 2-methoxyethyl phosphate
Methyl 1,2-dibromo-2-carbethoxy-1-methylethyl phenylphosphonate
Ethyl 1,2-dibromo-2-methoxycarbonyl-1-methylethyl dimethylaminophenylphosphonate
2-(1,2-dibromo-2-carbethoxyethyloxy)-4-methyl-2-oxy-1,3,2-dioxaphospholane
1,2-dibromo-2-(m-nitrobenzyloxycarbonyl)-1-methylethyl dimethyl phosphate
1,2-dibromo-2-(p-nitrobenzyloxycarbonyl)-1-methylethyl dimethyl phosphate
Dimethyl 1,2-dibromo-1-methyl-2-(p-tolyloxycarbonyl)-ethyl phosphate
Dimethyl 1,2-dibromo-2-phenethyloxycarbonylethyl phosphate
1,2-dibromo-2-(p-methoxybenzyloxycarbonyl)-1-methyl ethyl dimethyl phosphate
1,2-dibromo-2-chloro-2-phenoxyethoxycarbonylethyl dimethyl phosphate
1,2-dibromo-2-(p-chlorophenoxycarbonyl)-1-methylethyl dimethyl phosphate
1,2-dibromo-2-(p-chlorobenzyloxycarbonyl)-1-methylethyl dimethyl phosphate
Diethyl 1,2-dibromo-2-carboethoxy-1-methylethyl phosphate
Dimethyl 1,2-dibromo-2-carbomethoxy-2-phenylethyl phosphate
Diethyl 1,2-dibromo-2-carboethoxy-1-cyclopentyl phosphate
Diethyl 1,2-dibromo-2-chloro-1-ethoxy-2-carbethoxyethyl phosphate
Diethyl 1,2-dibromo-2-carbethoxy-1-chloroethyl phosphate
1,2-dibromo-2-chloro-2-carbethoxy-1-methylethyl dimethyl phosphate
Dimethyl 1,2-dibromo-2-chloro-2-carbomethoxy-1-methylethyl phosphate
Dimethyl 1,2-dibromo-2-(N,N-dimethylcarbamoyl)-1-methylethyl phosphate
Dimethyl 1,2-dibromo-2-(N,N-diethylcarbamoyl)-1-methylethyl phosphate
Dimethyl 1,2-dibromo-2-chloroethyl phosphate
Dimethyl 1,2,2-tribromoethyl phosphate
Dimethyl 1,2-dichloro-2-bromoethyl phosphate
1,2-dibromo-2-benzyloxycarbonyl-1-methylethyl methyl phenyl phosphate
1,2-dibromo-2-carbethoxyethyl dimethyl phosphate
1,2,2-trichloroethyl dimethyl phosphate
O,O-diethyl O-1,2-dibromo-2-(ethylthio)-carbonyl-1-methylethyl phosphorothioate
O-(p-chlorophenylsulfoxylethyl) O-ethyl O-1-methyl-1,2-dibromo-2-carbethoxyethyl phosphate
1,2-dibromo-2-chloro-2-(methoxycarbonyl)-1-methylethyl dimethyl phosphate
Diethyl 1,2-dibromo-2-carbethoxy-1-cyclopentyl thionophosphate
1,2-dibromo-2-chloro-2-acetyl-1-methylethyl diethyl phosphate
1,2-dibromo-2,2-dichloroethyl di-sec-butyl phosphate
1,2-dibromo-2,2-dichloroethyl ethyl phenylphosphonate
1,2,2,2-tetradibromoethyl dimethyl phosphate
1,2-dibromo-2,2-dichloro-1-phenylethyl dimethyl phosphate
1,2-dibromo-2-chloro-1-phenylethyl diethyl phosphate
1,2-dibromo-2-chloro-2-carbethoxy-1-methylethyl diethyl phosphate
1,2-dibromo-2,2-dichloroethyl ethyl 1,2-dichloropropyl phosphate
Dimethyl 1,2-dibromo-2-benzyloxycarbonyl-1-methylethyl phosphate These pesticides are most conveniently prepared by halogenating the known corresponding enol esters of acids of pentavalent phosphorus, which enol esters have the formula $$\left(R-X\right)_m \overset{X}{\underset{(R)_n}{P}} -X-\overset{R'}{\underset{}{C}}=\overset{R'}{\underset{}{C}}-R''$$

wherein the various symbols have the respective meanings already set out herein.

This class of enol esters is well known in the art, various subclasses thereof being described in such United States patents as U.S. 2,685,552; U.S. 2,744,128; U.S. 2,765,331; U.S. 2,788,358; U.S. 2,802,855; U.S. 2,865,943; U.S. 2,865,944; U.S. 2,867,646; U.S. 2,891,887; U.S. 2,-894,014; U.S. 2,894,018; U.S. 2,895,982; U.S. 2,898,341; U.S. 2,908,605; U.S. 2,913,367; and U.S. 2,956,073; and in such British patents as No. 783,697.

The preparation of a particular species of these pesticides is shown in U.S. Patent No. 2,971,882. The preparation of other species is shown in copending applications Serial Nos. 30,757 and 30,776, both applications filed May 23, 1960.

Halogenation of these enol esters is generally most effectively accomplished by contacting the ester with free halogen, a suitable solvent being used if necessary to moderate the reaction. The addition of the halogen should be conducted at a rather low temperature to avoid decomposition of the phosphorus-containing reactant and/or the phosphorus-containing product. Thus, during addition of the halogen, the reaction mixture temperature should be kept below about 40° C. After addition of the halogen is complete, the reaction mixture may be warmed to a somewhat higher temperature—preferably not exceeding about 60° C.—to insure completion of the halogenation. In many cases, it may be found best to maintain the reaction at a low temperature—say, in the range of from about −5° C. to about 30° C.—during addition of the halogen, then warm the mixture to a higher temperature to insure complete reaction. A particularly suitable solvent in most cases is methylene dichloride. Actinic radiation, for example, ultraviolet light, may be used to promote the addition of the halogen.

The product is generally most easily worked up by distillation techniques. In many cases, it will be found that little or no side reactions occur, so that a sufficiently pure product will be obtained by simply stripping the solvent from the final reaction mixture, preferably using sub-atmospheric pressure as necessary to avoid thermal decomposition of the product. If a pure product is required, it can be obtained by extraction, distillation or other known means for purifying organo-phosphorus compounds.

Since the halogen reacts substantially only with the olefinic double bond of the ester reactant, in many cases, to obtain a pure product it is necessary only to add the stoichiometric amount of halogen. Alternatively, the course of the reaction may be checked, by means of infrared spectrum analysis, for example, to determine when all of the olefinic double bonds of the ester reactant have been reacted with halogen.

Should some of the ester reactant remain in the final mixture, it may be allowed to remain therein, since it will not affect the pesticidal activity of the halogenated product, but will be present merely as an inert diluent. Of course, where the ester reactant is a good pesticide, some of it may be allowed in the product to provide that product with additional pesticidal activity.

Formulations of these and similar pesticides on solid carrier materials are stabilized by phenols, generally. Thus, phenol itself is a suitable stabilizer, as are other mononuclear phenols such as alkyl-substituted phenols. The stabilizer suitably may be a polynuclear phenol, such as alpha- and beta-naphthols. Polyphenols, such as hydroquinone and 2,2'-bis(p-hydroxyphenyl)propane, also are suitable. Those phenols which are known to be antioxidants are suitable. These include the so-called "kryptophenols"—phenols substituted at one or both of the carbon atoms of the aromatic ring in position ortho to the carbon atom thereof to which is bonded the phenolic hydroxyl group—in which a stereo-chemical effect shields or protects the phenolic hydroxyl group. These also include the polyphenols with ortho and para hydroxyl groups—which can undergo hydroquinone-quinone transformation. It must be noted, however, that the property of being an antioxidant is not essential to the utility of a phenol as a stabilizer in the present invention, since phenol itself, and beta-naphthol, which are not considered to be antioxidants, are quite suitable as stabilizers in the present invention. Other specific phenols which may be used to stabilize these pesticides include catechol, pyrogallol, resorcinol, phloroglucinol, sesamol, 3-phenylisocoumarone, the tocopherols, p-aminophenol, phenol ethers, 2,6-di-tert-butylphenol, 2,6-di-tert-butyl-alpha-dimethylamino-p-cresols, the cresols, 4,4'-bis(2,6-di-tert-butylphenol), 4,4'-methylene-bis(6-tert-butyl-o-cresol), 2,6-di-tert-butyl-alpha-methoxy-p-cresol, 2,6-di-tert-butyl-p-cresol, 2,2'-methylenebis(4 - methyl-6-tert-butylphenol), butylated hydroxyanisoles, propyl gallate, butylated hydroxytoluenes, 2-hydroxy-4-methoxybenzophenone, 3,5-di-tert-butyl-4-hydroxybenzyl alcohol, p-octylphenol, p-nonylphenol, p-tert-butylphenol, 2,6-di-tert-butyl-4-methylphenol, 2,6-diisopropylphenol, 2,6-di-tert-amylphenol, 2,4,6-trimethylphenol, 2,4,6-tri-tert-butylphenol, 2,3,4,5-tetramethylphenol, pentamethylphenol and the like. From the evidence available those phenols in which the phenolic hydroxy group or groups is or are the only acidic substituent(s) appear to be most useful, such phenols containing only carbon, hydrogen and oxygen being preferable. Those phenols containing not more than twenty carbon atoms appear to have the most desirable physical properties, and therefore are generally to be preferred.

As has already been pointed out, the available evidence shows that the instability of these pesticides occurs without regard to the chemical nature of the solid carrier material used—the instability exists with all solid carrier materials. Included are such common carrier materials as various clays, including attapulgite clays, such as those sold commercially under the tradenames of Attaclay and Diluex; montmorillonite clays, such as those sold commercially under the tradenames Pike's Peak clay 9T66 and FF absorptive clay; dusting sulfur; corn starch; calcium carbonate; crushed corn cobs; perlite; silicas, such as those sold under the tradenames Silikil and Hi-Sil 233; kaolin clays, such as those sold under the tradenames Barden AG, ASP–105 and ASP–200; pyrophyllite, such as that sold under the name Pyrax ABB; talc, such as is sold under the tradename Emtal 23A; sand; crushed granite; sugar and diatomaceous earths, such as those sold commercially under the tradename Diacron.

The invention thus is applicable to the stabilization of solid formulations of the herein defined pesticides impregnated upon such carrier materials as kaolin clays, attapulgite clays, diatomaceous earths, vermiculites, synthetic calcium silicates, crushed rock, rock flour, sand, talc, powdered calcium carbonate, lime, gypsum, pyrophyllite, powdered carbon—i.e., charcoal—and the like, upon sugar or like solid materials which are useful as baits (in the case of the insecticides), upon organic fibrous materials, such as crushed corncobs, bagasse, crushed or powdered nut shells, or the like.

Because of their characteristics, the preferred carrier materials for use with these pesticides are the montmorillonite clays, particularly that known as Pike's Peak clay, sand, sugar, pyrophyllites, particularly that known as Pyrax ABB and talc, particularly that known as Emtal 23A.

But a minor amount of phenol stabilizer is required. Thus, in most cases, from about 0.1 to about 10 percent by weight of stabilizer, based upon the weight of the pesticide-carrier formulation will be sufficient. This is not to say, however, that in some cases, more or less of the stabilizer may be used to advantage. In the great majority of cases, it will be found that at least 0.01 percent of the stabilizer will be required, and that seldom will an amount of stabilizer in excess of 20 percent by weight of the pesticide-carrier formulation be of such additional advantage as to be desirable.

The phenol stabilizer is incorporated in the formulation in any manner which will enable it to be intimately contacted with the pesticide therein. The phenol may be dissolved in the pesticide, or vice versa, depending upon the relative concentrations and solubilities of the two materials. Alternatively, and where the physical state of the phenol permits, it may be merely intimately mixed in the already formed mixture of carrier and pesticide. Otherwise, the phenol, or the phenol and pesticide together, can be disolved in a suitable solvent, and the solution mixed with the carrier or the carrier-pesticide mixture, as the case may be. The solvent then may be removed wholly, or in part; or in some cases, it may be desirable to include the solvent in the formulation.

The formulations are otherwies compounded and used by techniques well known and generally practiced by the art. Thus, the formulation may be in the form of a dust, in the form of granules, in the form of wettable powders, or in other forms suitable to the intended use. The formulation can contain other materials to provide necessary physical characteristics—thus, stickers, emulsifiers, spreading or wetting agents, fertilizers, other insecticides and/or fungicides, other biocides or the like, can be incorporated in the formulation by known means. Suitably, any of the materials known to the prior art can be used, as desirable to impart the desired characteristic(s) to the final formulation. As sticking agents, there may be used casein, gelatine, cellulose derivatives such as carboxymethylcellulose, sulfite waste liquor, a gum, a water-dispersible synthetic resin, mineral oil, or equivalent adhesives, all of which are well known in the art. Wetting agents and dispersing agents which may be employed include the various naturally occurring or synthetic surface-acting materials known for the purpose, such as, inter alia, soaps, saponins, lecithins, fatty acid salts, long-chain alcohols, sulfonated aliphatic and/or aromatic hydrocarbon derivatives, hydroxy esters, such as sorbitan monolaurate, pine oil, and the like. There may be employed other insecticidal agents or natural or synthetic, of mineral or organic origin, among which come into consideration sulfur, copper arsenate, pyrethrum, allethrin, DMC, HETP, malathion, DDT, BHC, lindane, and others well known to those skilled in the art. Suitable fertilizers would include ammonium sulfate, urea, ammonium phosphate, potassium nitrate, and the like. The concentration of the pesticide in the final formulation can vary widely, depending upon the use to which the formulation is to be placed. Thus, the pesticide concentration can be as little as 0.1 percent of the weight of the formulation or it can be as great as 50% or even more, in the case of the so-called "concentrated" formulations which are to be diluted before use. Typically, a granular formulation may contain from about 2% to about 35% pesticide by weight. This type of formulation is generally used as such without further dilution with an inert carrier.

Typically, a dust formulation can contain about 0.25% pesticide up to about 75% pesticide by weight. Frequently, the dust formulations are first prepared as so-called "concentrates" which contain typically from about 10% to about 50% pesticide dispersed in the dust, and such "concentrate" is further diluted to a so-called "field strength" dust typically having a pesticide concentration of about 0.25% to about 5%, varying with the use desired and the potency of the toxicant.

The wettable powders typically contain a concentration of toxicant on the order of that contained in dust concentrates as above described. However, they are diluted to "field strength" by dispersing in water rather than by dispersing in dust.

The following data, obtained with a typical species of the pesticides under consideration, exemplifies practice of this invention, and illustrates the benefits to be derived therefrom:

Formulations were prepared in which the toxicant, dimethyl 1,2-dibromo-2,2-dichloroethyl phosphate, was impregnated upon a typical bait formulation carrier mixture consisting of sand and sugar in the weight ratio 70:30, and containing 1% by weight of the mixture of expanded perlite. The concentration of toxicant in all cases was 0.5 percent of the weight of the carrier mixture. The stabilizers tested and the results thereof were as follows:

| Stabilizer | Concentration, percent by weight of composition | Decomposition of Toxicant, percent by weight, after holding the formulation for two weeks at 130° F. |
| --- | --- | --- |
| None | | 94 |
| Phenol | 1 | 11 |
| Beta-naphthol | 1 | 22 |
| 2,6-di-tert-butyl-4-methyl phenol | 1 | 21 |

It is evident from the above data that a small quantity of the present phenol stabilizers unexpectedly provides superior protection against deterioration of the pesticide when in contact with the indicated carrier materials. So, too, when others of the previously described carriers are used in the pesticide formulations comparable results are obtained.

I claim as my invention:

1. A stable solid pesticidal composition comprising in combination:
  (a) a substantially toxicologically inert solid carrier material,
  (b) a pesticide of the formula:

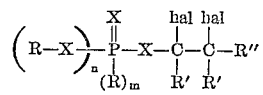

wherein hal represents halogen of the group consisting of chlorine and bromine, X represents a member of the group consisting of oxygen and sulfur, R represents a radical containing up to 10 carbon atoms which is a member of the group consisting of alkyl, cycloalkyl, aryl, alkaryl and aralkyl radicals and such radicals substituted by from one to a plurality of substituents from the group consisting of chlorine, bromine, nitro, ether (—O—R°) and amino

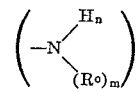

radicals wherein R° represents a hydrocarbon radical of the group represented by R, R' represents a member of the group consisting of hydrogen, chlorine, bromine, and radicals represented by R, and R" represents a member of the group consisting of chlorine, bromine, radicals represented by R, carboalkoxy radicals of up to 10 carbon atoms, alkoxyalkyleneoxycarbonyl radicals of up to 10 carbon atoms, ether radicals (—O—R), acyloxyalkoxycarbonyl radicals containing up to 10 carbon atoms wherein the acyl group is R—C(O)— and amido radicals

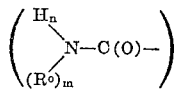

of up to 10 carbon atoms, and $n$ is an integer from 0 to 2, with the proviso that $m+n=2$,
  (c) a phenol,
    the amount of said phenol being sufficient to stabilize said pesticide against decomposition.

2. The composition defined in claim 1 wherein the pesticide has the formula of claim 1 wherein X is oxygen, $n$ is 2 and hal represents bromine.

3. A stable solid pesticidal formulation comprising in combination:
  (a) a substantially toxicologically inert solid carrier material, (b) as pesticide a dialkyl 1,2-dibromo-2,2-dichloro-ethyl phosphate wherein each alkyl group contains from 1 to 4 carbon atoms,
(c) a phenol,
the amount of said phenol being sufficient to stabilize said pesticide against decomposition.

4. The composition defined in claim 3 wherein the pesticide is dimethyl 1,2-dibromo-2,2-dichloroethyl phosphate.

5. A stable solid pesticidal formulation comprising in combination:
(a) a substantially toxicologically inert solid carrier material,
(b) a pesticide of the formula:

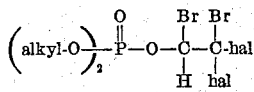

wherein alkyl represents an alkyl radical of from 1 to 4 carbon atoms, and hal represents halogen of the group consisting of chlorine and bromine,
(c) a phenol,
the amount of said phenol being sufficient to stabilize said pesticide against decomposition.

6. A stable solid pesticidal formulation comprising in combination:
(a) a substantially toxicologically inert solid carrier material,
(b) a pesticide of the formula:

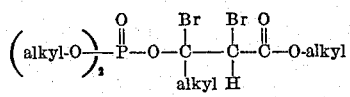

wherein alkyl represents an alkyl radical of from 1 to 4 carbon atoms,
(c) a phenol,
the amount of said phenol being sufficient to stabilize said pesticide against decomposition.

7. A stable solid pesticidal formulation comprising in combination:
(a) a substantially toxicologically inert solid carrier material,
(b) A pesticide of the formula:

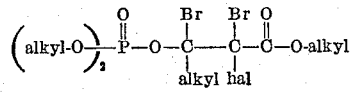

wherein alkyl represents an alkyl radical of from 1 to 4 carbon atoms, and hal represents halogen of the group consisting of chlorine and bromine,
(c) a phenol,
the amount of said phenol being sufficient to stabilize said pesticide against decomposition.

References Cited in the file of this patent

UNITED STATES PATENTS

| | | |
|---|---|---|
| 2,744,128 | Morris | May 1, 1956 |
| 2,865,944 | Stiles | Dec. 23, 1958 |
| 2,894,014 | Stiles | July 7, 1959 |
| 2,898,341 | Schring | Aug. 4, 1959 |
| 2,913,367 | Davison | Nov. 17, 1959 |
| 2,956,073 | Whetstone | Oct. 11, 1960 |
| 2,971,882 | Ospenson et al. | Feb. 14, 1961 |
| 3,005,841 | Silverman | Oct. 24, 1961 |

OTHER REFERENCES

King, U.S. Dept. Agr. Handbook No. 69, pages 257–260 (1954).